US010654650B1

(12) United States Patent
Engle

(10) Patent No.: US 10,654,650 B1
(45) Date of Patent: May 19, 2020

(54) BARREL ROLLING SAFETY DEVICE

(71) Applicant: Uncommon Solutions, LLC, Floys Knobs, IN (US)

(72) Inventor: John Rae Engle, Floyds Knobs, IN (US)

(73) Assignee: Uncommon Solutions, LLC, Floyds Knobs, IN (US)

(*) Notice: Subject to any disclaimer, the term of this patent is extended or adjusted under 35 U.S.C. 154(b) by 0 days.

(21) Appl. No.: 16/208,269

(22) Filed: Dec. 3, 2018

(51) Int. Cl.
*B65G 7/10* (2006.01)
*B65G 9/00* (2006.01)
*B65G 47/88* (2006.01)
*B65G 1/12* (2006.01)
*B65G 1/08* (2006.01)

(52) U.S. Cl.
CPC .............. *B65G 7/10* (2013.01); *B65G 9/006* (2013.01); *B65G 47/8823* (2013.01); *B65G 47/8876* (2013.01); *B65G 1/08* (2013.01); *B65G 1/12* (2013.01); *B65G 9/004* (2013.01); *B65G 2201/0241* (2013.01)

(58) Field of Classification Search
CPC .......... B65G 7/10; B65G 9/006; B65G 9/004; B65G 2201/0241; B65G 47/8823; B65G 47/8876; B65G 47/8884; B65G 47/8892; B65G 13/075; B65G 47/266; B65G 47/29; B65G 47/295; B56G 1/12
USPC ....................................................... 193/35 A
See application file for complete search history.

(56) References Cited

U.S. PATENT DOCUMENTS

| 1,819,032 | A |   | 8/1931  | Lehman                    |
|-----------|---|---|---------|---------------------------|
| 2,455,426 | A |   | 12/1948 | Livingston                |
| 2,818,978 | A |   | 1/1958  | Post                      |
| 3,088,569 | A | * | 5/1963  | McClelland, Jr. .... B65G 47/29 |
|           |   |   |         | 193/40                    |
| 3,241,666 | A | * | 3/1966  | Preu ................ B65G 47/8823 |
|           |   |   |         | 209/522                   |
| 3,368,690 | A |   | 2/1968  | Konstant                  |
| 3,432,076 | A | * | 3/1969  | Arsenault ........... B65G 47/295 |
|           |   |   |         | 221/295                   |
| 3,830,409 | A | * | 8/1974  | Jenkinson ......... B65G 47/8823 |
|           |   |   |         | 221/236                   |
| 3,881,585 | A | * | 5/1975  | Coleman ............. B65G 13/075 |
|           |   |   |         | 193/35 A                  |

(Continued)

FOREIGN PATENT DOCUMENTS

GB 784658 A * 10/1957 ............. B65G 47/29

Primary Examiner — Mark A Deuble
(74) Attorney, Agent, or Firm — Middleton Reutlinger

(57) ABSTRACT

A barrel rolling safety device and a method relating to using the barrel safety rolling device are disclosed herein. The barrel safety rolling device includes a base plate having a plurality of apertures, a stopping arm having at least a first end, a second end, and a stopping arm aperture, and a pin having at least a removal ring. Each of the apertures may be configured to receive the pin, and one or more bushings allow the stopping arm to rotate between various positions based on which aperture of the apertures receives the pin. In various embodiments, the stopping arm may allow a barrel to traverse a dunnage in a first direction, but prevent the barrel from traversing the dunnage in a second direction. In various embodiments, the stopping arm may prevent the barrel from traversing the rack in both the first direction and second direction.

18 Claims, 7 Drawing Sheets

(56) References Cited

U.S. PATENT DOCUMENTS

| | | | | |
|---|---|---|---|---|
| 3,999,684 A | * | 12/1976 | Ekholm | B65G 47/8815 |
| | | | | 221/301 |
| 4,132,052 A | | 1/1979 | Larson | |
| 7,641,059 B2 | * | 1/2010 | Gracia Lecina | B65G 1/14 |
| | | | | 211/194 |
| 2007/0175729 A1 | * | 8/2007 | Robinson | B65G 47/8823 |
| | | | | 193/35 A |
| 2014/0008179 A1 | * | 1/2014 | Matsumoto | B65G 47/8807 |
| | | | | 198/459.6 |
| 2019/0152705 A1 | * | 5/2019 | Guo | B65G 47/8823 |

* cited by examiner

BARREL ROLLING SAFETY DEVICE

CROSS-REFERENCE TO RELATED APPLICATIONS

None.

TECHNICAL FIELD

Generally, a barrel rolling safety device is taught. Additionally, a method for using the barrel rolling safety device is taught.

BACKGROUND

In the bourbon and whisky industries, after the alcohol is distilled, the resulting spirit, sometimes referred to as "white dog", is placed in a barrel and the barrel is stored on a dunnage, or rack, in a barrel storage warehouse. The barrels are usually made of white oak, and the inside of the barrel is usually charred to prime the wood and add a smoky flavor to the bourbon, whiskey, and/or another resulting spirit. The barrel storage warehouse is a large warehouse where hundreds, if not thousands, of barrels are stored on dunnages. The dunnage is two or more parallel beams, usually made of wood, that allow the barrel to traverse along the dunnage. Several dunnages may be stacked one upon one another vertically and placed side-by-side horizontally to maximize how many barrels may be stored in the barrel storage warehouse. The barrels remain on the dunnages for at least several years to allow the resulting spirit to mature by gaining various colors and flavors from the charred barrels.

Storing the barrels on the dunnages can be a hazardous process that involves moving the barrel from where it is filled with the resulting spirit to the barrel storage warehouse, lifting the barrel to a desired dunnage in the barrel storage warehouse, and maneuvering the barrel into a desired position on the desired dunnage. Most barrels used in the bourbon and whiskey industry hold up to 53 gallons of the resulting spirit, and a filled barrel can weigh up to 500 pounds. Lifting the barrel usually requires the operation of a lifting system, such as a mechanical, pneumatic, hydraulic, or electric elevator, to lift the barrel up to the desired dunnage, the operator may then climb up to the desired dunnage and manually push or roll the barrel from the lifting system onto the desired dunnage. Not only is the barrel heavy, but the operator manually pushing the barrel also has limited space to maneuver around other dunnages that already have barrels stored thereon.

This process of storing a barrel on a dunnage may cause other dunnages and/or other barrels to move around while a particular barrel is in the process of being stored, thus creating a hazardous situation for the operator. Further, a natural disaster, such as an earthquake, could cause an unpredictable hazardous situation for an operator in a barrel storage warehouse, and could cause extremely large monetary damages due to unsecured barrels breaking if the barrels are not properly secured on the dunnage in the barrel storage warehouse.

Moreover, safety is a growing priority in the storage of barrels in the bourbon and whisky industries. Recent events, such as the collapse of a barrel storage warehouse in Kentucky, have brought safety in the storage of barrels in the bourbon and whisky industries to the forefront. Therefore, there is a need in the art for further facilitating the safe storage of barrels in the bourbon and whisky industries.

SUMMARY

Generally, in one aspect, a safety device is provided. The safety device includes a base plate having a first side, a second side, and a plurality of apertures, where the second side of the base plate is connected to a first rail of a dunnage rack by a first fastener. The safety device further includes a stopping arm having a first end, a second end, and a stopping arm aperture, where the stopping arm is connected to the first side of the base plate by a second fastener. The stopping arm is rotatable about the second fastener. The safety device further includes a pin, where the pin is connected to the base plate by a pin securing mechanism. The pin is removable and insertable through each of the apertures and through the stopping arm aperture.

In some embodiments, when the pin is inserted through a first aperture of the apertures, a barrel may be allowed to traverse the dunnage rack in a first direction over the stopping arm. In some of these embodiments, when the pin is inserted through the first aperture of the apertures, the barrel may be prevented from traversing the dunnage rack in a second direction over the stopping arm. In some of these embodiments, when the pin is inserted through the first aperture of the apertures, the first end of the stopping arm may abut a portion of the barrel to prevent the barrel from traversing the dunnage rack in the second direction over the stopping arm.

In some embodiments, when the pin is inserted through the stopping arm aperture and through a second aperture of the apertures, the barrel may be prevented from traversing the dunnage rack in a first direction over the stopping arm. In some of those embodiments, when the pin is inserted through the stopping arm aperture and through the second aperture of the apertures, the barrel may be prevented traversing the dunnage rack in a second direction over the stopping arm. In some of those embodiments, when the pin is inserted through the stopping arm aperture and through the second aperture of the apertures, the second end of the stopping arm may abut a portion of the barrel to prevent the barrel from traversing the dunnage rack over the stopping arm in the first direction and the second direction.

In some embodiments, the pin may be removed from the apertures to allow the barrel to traverse the dunnage rack in both a first direction and a second direction over the stopping arm.

In some embodiments, the pin may be connected to the base plate by a tether and include a removal ring. The pin is removable by the ring and the tether may be connected to the base plate by a locking plate interposed between the base plate and the first rail.

In some embodiments, the safety device further includes one or more bushings. The second fastener may be inserted into the one or more bushings, such that the stopping arm is rotatable about the second fastener by the one or more bushings.

In some embodiments, the pin includes a spring-loaded ball that may compress when the pin is initially inserted into the apertures. Further, the spring-loaded ball may decompress when the pin completely passes through at least one of the apertures.

Generally, in another aspect, a safety device is provided. The safety device includes a plurality of base plates, each base plate of the base plates having a first side, a second side, and a plurality of apertures, the second side of a first base plate of the base plates is connected to a first rail of a dunnage rack by a first fastener, and the second side of a second base plate of the base plates is connected to a second rail of the dunnage rack by an additional first fastener. The safety device further includes a plurality of stopping arms, each stopping arm of the stopping arms having a first end, a second end, and a stopping arm aperture, a first stopping arm of the stopping arms is connected to the first side of the first base plate by a second fastener, a second stopping arm of the stopping arms connected to the first side of the second base plate by an additional second fastener. Each of the stopping arms are rotatable about the second fastener and the additional second fastener respectively. The safety device further includes a plurality of pins. Each pin is removable insertable through each of the apertures and through the stopping arm aperture.

Generally, in yet another aspect, a method of using a safety device is provided. The method includes connecting a safety device to a first rail of a dunnage rack. The safety device includes a base plate having a first side, a second side, and a plurality of apertures, a stopping arm having a first end, a second end, and a stopping arm aperture. The stopping arm is rotatable about a fastener. The safety device further includes a pin that is removable and insertable through each of the apertures and through the stopping arm aperture. The method further includes inserting the pin through a first apertures of the apertures, lifting a barrel to the dunnage rack, pushing the barrel onto the dunnage rack in a first direction over the safety device, removing the pin from the first aperture of the apertures, rotating the stopping arm causing the stopping arm aperture and a second aperture of the apertures to align, and inserting the pin through the stopping aperture and through the second aperture of the apertures.

In some embodiments, inserting the pin through the first aperture of the apertures allows the stopping arm to rotate counter-clockwise and allows the barrel to traverse the dunnage rack in the first direction over the stopping arm. In some embodiments, inserting the pin through the first aperture of the apertures prevents the stopping arm from rotating clockwise and prevents the barrel from traversing the dunnage rack in the second direction over the stopping arm.

In some embodiments, inserting the pin through the stopping arm aperture and through the second aperture of the apertures prevents the stopping arm from rotating and prevents the barrel from traversing over the stopping arm in both the first direction and a second direction.

In some embodiments, the method further includes removing the pin from the stopping arm aperture and the second aperture of the apertures, and pulling the barrel off the dunnage rack in a second direction over the safety device. In some of those embodiments, removing the pin from the stopping arm aperture and the second aperture of the apertures allows the stopping arm to rotate both counter-clockwise and clockwise. In some of those embodiments, removing the pin from the stopping arm aperture and the second aperture of the apertures allows the barrel to traverse the dunnage rack over the stopping arm in both the first direction and the second direction.

In some embodiments, the pin may be connected to the base plate by a tether and include a removal ring. The pin is removable by the ring and the tether may be connected to the base plate by a locking plate interposed between the base plate and the first rail.

In some embodiments, the safety device further includes one or more bushings. The second fastener may be inserted into the one or more bushings to allow the stopping arm to rotate about the second fastener by the one or more bushings.

It should be appreciated that all combinations of the foregoing concepts and additional concepts discussed in greater detail below provided such concepts are not mutually inconsistent are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

In the drawings, like reference characters generally refer to the same parts throughout the different views. Also, the drawings are not necessarily to scale, emphasis instead being generally placed upon illustrating the principles of the embodiments depicted.

DETAILED DESCRIPTION OF THE DRAWINGS

Figure 1:
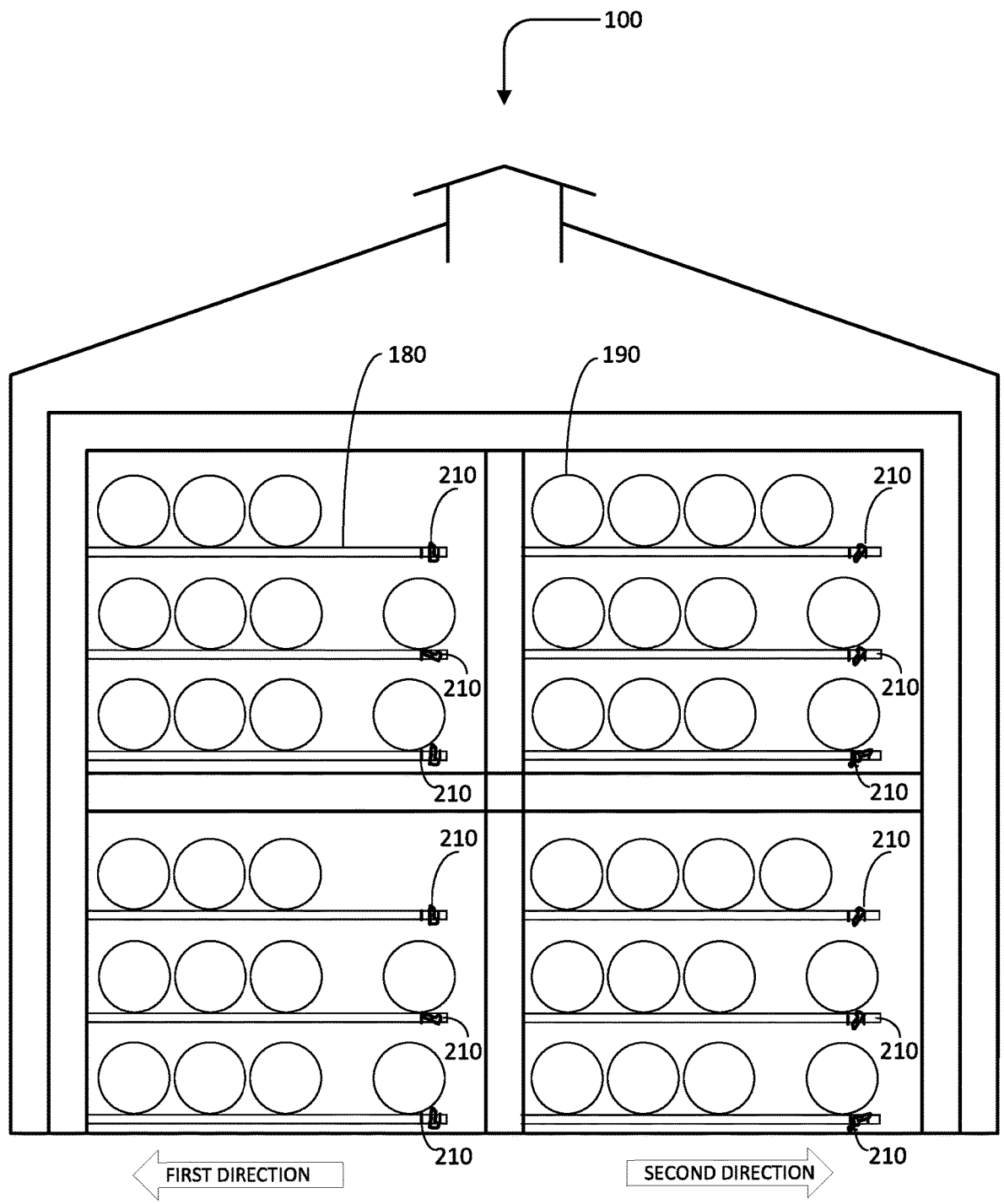
FIG. 1 is an environmental view of a barrel storage warehouse utilizing a plurality of barrel rolling safety devices according to one embodiment herein.

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections and couplings. In addition, the terms "connected" and "coupled" and variations thereof are not restricted to physical or mechanical connections or couplings.

Referring initially to FIG. 1, an environmental view of a barrel storage warehouse 100 utilizing a plurality of barrel rolling safety devices 210 according to one embodiment herein. The barrel storage warehouse 100 includes a plurality of dunnage racks 180. Each of the dunnage racks 180 includes at least two parallel rails, or beams, that enable a plurality of barrels 190 to be stored thereon. The dunnage racks 180 are usually made of wood or metal to support the weight of each of the barrels 190. In some embodiments, the safety devices 210 may be connected to a first rail of each of the dunnage racks 180. In other embodiments, the safety devices 210 may be connected to both the first rail and a second rail of each of the dunnage racks 180. In yet other embodiments, the safety devices 210 may be connected to the first rail in various locations along the first rail, such that each of the barrels 190 has a respective one of the safety devices 210. The safety devices 210 are described in more detail hereinbelow with respect to FIGS. 2A, 2B, 3, 4, 5, and 6. Although FIG. 1 only depicts a first rail for each of the dunnage racks 180 that is not meant to be limiting. It should be understood that each of the dunnage racks 180 in the barrel storage warehouse 100 have at least a first rail and a second rail.

In the barrel storage warehouse 100, each of the plurality of dunnage racks 180 may be vertically stacked and a plurality of vertically stacked dunnage racks 180 may abut one another horizontally, thus maximizing the amount of the barrels 190 that may be stored in the barrel storage warehouse 100.

After each of the barrels 190 are filled with a resulting spirit and moved to the barrel storage warehouse, each of the barrels 190 may be lifted to a desired dunnage rack of the dunnage racks 180. The barrel may be lifted to the desired dunnage rack by using a lifting mechanism. Generally, the lifting mechanism is a barrel storage warehouse elevator. However, the lifting mechanism may be any mechanical, pneumatic, hydraulic, or electric elevator, capable of lifting the barrel up to the desired dunnage rack. Alternatively, an operator of the barrel storage warehouse may manually lift the barrel to the desired dunnage rack manually by using a pulley-lever system.

After the barrel of the barrels 190 is lifted to the desired dunnage rack of the dunnage racks 180, the barrel may be pushed or rolled from the lifting system onto the desired dunnage rack, and pushed along the desired dunnage rack in a first direction and over the safety device 210. The barrel may be stored on the desired dunnage rack for at least several years to allow the resulting spirit to mature by gaining various colors and flavors from the barrel. Once the resulting spirit in the barrel matures to a desired age or gains a desired color and/or flavor, the barrel may be removed from the desired dunnage rack. The barrel may be pulled along the desired dunnage rack in a second direction and over the safety device 210 and onto the lifting mechanism. The barrel may then be lowered using the lifting mechanism and moved to a different location where the matured resulting spirit is bottled.

Referring generally to FIGS. 2A, 2B, 3, 4, 5, and 6, a safety device 210 is shown, where the safety device 210 is depicted in various positions, such as those positions depicted in FIG. 1, to facilitate the pushing or rolling of barrels in a first direction to load a dunnage rack and the pulling or rolling of barrels in a second direction to unload the dunnage rack. For the sake of brevity, the safety device 210 of FIGS. 2A, 2B, 3, 4, 5, and 6 is depicted as being connected to a first rail of a dunnage rack. Further, for the sake of brevity, the safety device 210 of FIGS. 2A, 2B, 3, 4, 5, and 6 is depicted with respect to a single barrel traversing along a dunnage rack.

Figure 2A:
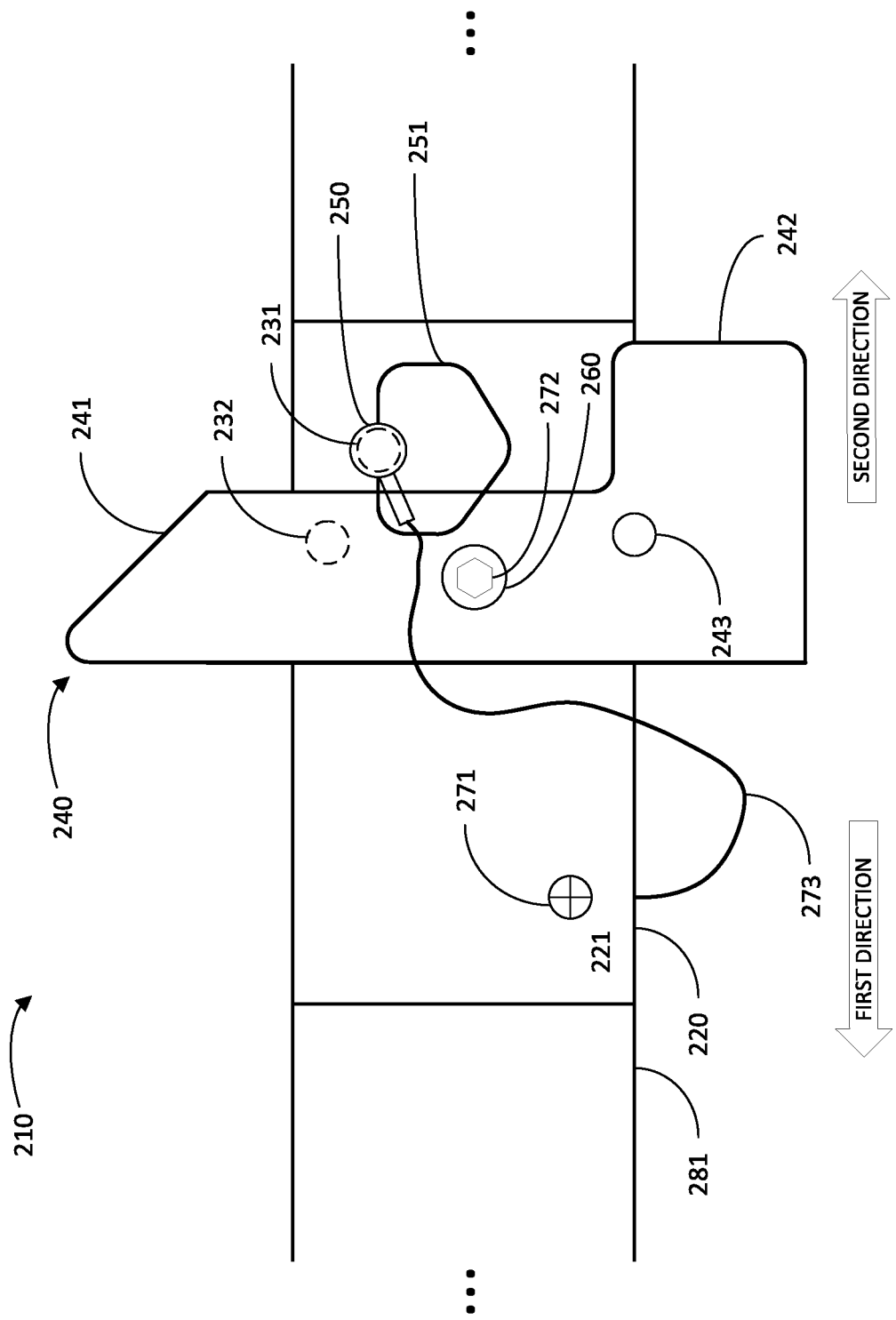
FIG. 2A is a side view of a barrel rolling safety device with a pin inserted through a first aperture according to one embodiment herein.

FIG. 2A is a side view of a barrel rolling safety device 210 with a pin 250 inserted through a first aperture 231 according to one embodiment herein. The barrel rolling safety device 210 includes a base plate 220 having a first side 221, a second side 222, a first aperture 231, and a second aperture 232. Further, the base plate 220 is connected to a first rail 281 of a dunnage rack by one or more base plate securing mechanisms or one or more first fasteners 271. It is noted that in FIG. 2A the first aperture 231 and the second aperture 232 are depicted as dashed lines. Dashed lines throughout the FIGS. are used for illustrative purposes to depict what would otherwise be obscured by various elements of the safety device 210.

The safety device 210 further includes a stopping arm 240 having a first end 241, a second end 242, and a stopping arm aperture 243. The stopping arm 240 is secured to the base plate 220 and the first rail 281 of the dunnage rack by a stopping arm securing mechanism or a second fastener 272. Further, the stopping arm is rotatable about the second fastener 272 by a rotation mechanism or one or more bushings 260. The bushings 260 allow the stopping arm 240 to rotate smoothly about the second fastener 272 in both clockwise and counter-clockwise directions. Although the stopping arm 240 is depicted as being substantially "L-shaped", this is for illustrative purposes. It is noted that the stopping arm 240 may take the form of other shapes and behave in a substantially similar manner according to various embodiments disclosed herein.

Figure 3:
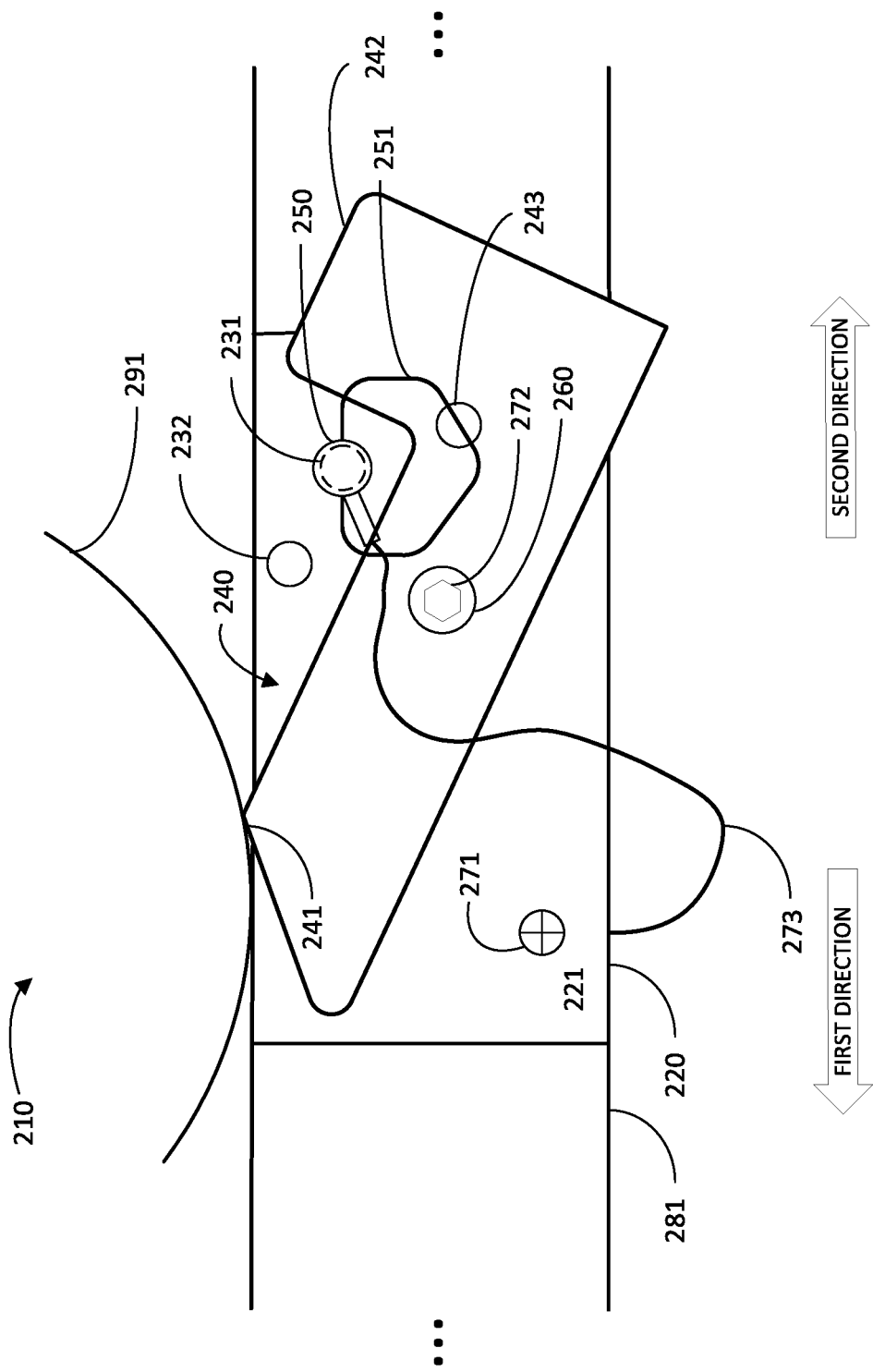
FIG. 3 is a side view of the barrel rolling safety device with the pin inserted through the first aperture as a barrel traverses a dunnage rack in a first direction according to one embodiment herein.

Further, the second end 242 of the stopping arm 240 may outweigh the first end 241 of the stopping arm 240 such that the stopping arm 240 remains in a resting position that is substantially vertical, as depicted in FIG. 2A, until a barrel traverses along the dunnage rack in a first direction and abuts the first end 241 of the stopping arm 240. After the barrel is pushed or rolled over the safety device 210, as depicted in FIG. 3, the stopping arm 240 may return to the resting position that is substantially vertical, as depicted in FIG. 2A. Accordingly, the first end 241 of the stopping arm 240 may prevent the barrel from traversing along the dunnage rack in the second direction, as described in more detail hereinbelow with respect to FIG. 4.

The safety device 210 further includes a pin 250 having a removal ring 251. The pin 250 may be inserted through one or more of the first aperture 231, the second aperture 232, and/or the stopping arm aperture 243. In FIG. 2A, the pin 250 is depicted as being inserted through the first aperture 231 of the base plate 220. The stopping arm 240 may, by the bushings 260 and based on which aperture of the first aperture 231, the second aperture 232, and the stopping arm aperture 243 the pin 250 is inserted therein, rotate about the second fastener 272. The pin 250 may be removed from any of the apertures by pulling the removal ring 251. Further, the pin 250 is connected to the base plate 220 of the safety device 210 by a pin securing mechanism or tether 273. Further, the tether 273 may be connected to the base plate 220 by a locking plate 274. The locking plate 274 may be interposed between the base plate 220 and the first rail 281. One or more of the first fasteners 271 may also be inserted through an aperture of the locking plate 274 to ensure the locking plate 274 stays in place. By using the locking plate 274, the tether 273 may hang freely from the safety device 210 and reduce the likelihood the tether may be frayed over time.

Figure 2B:
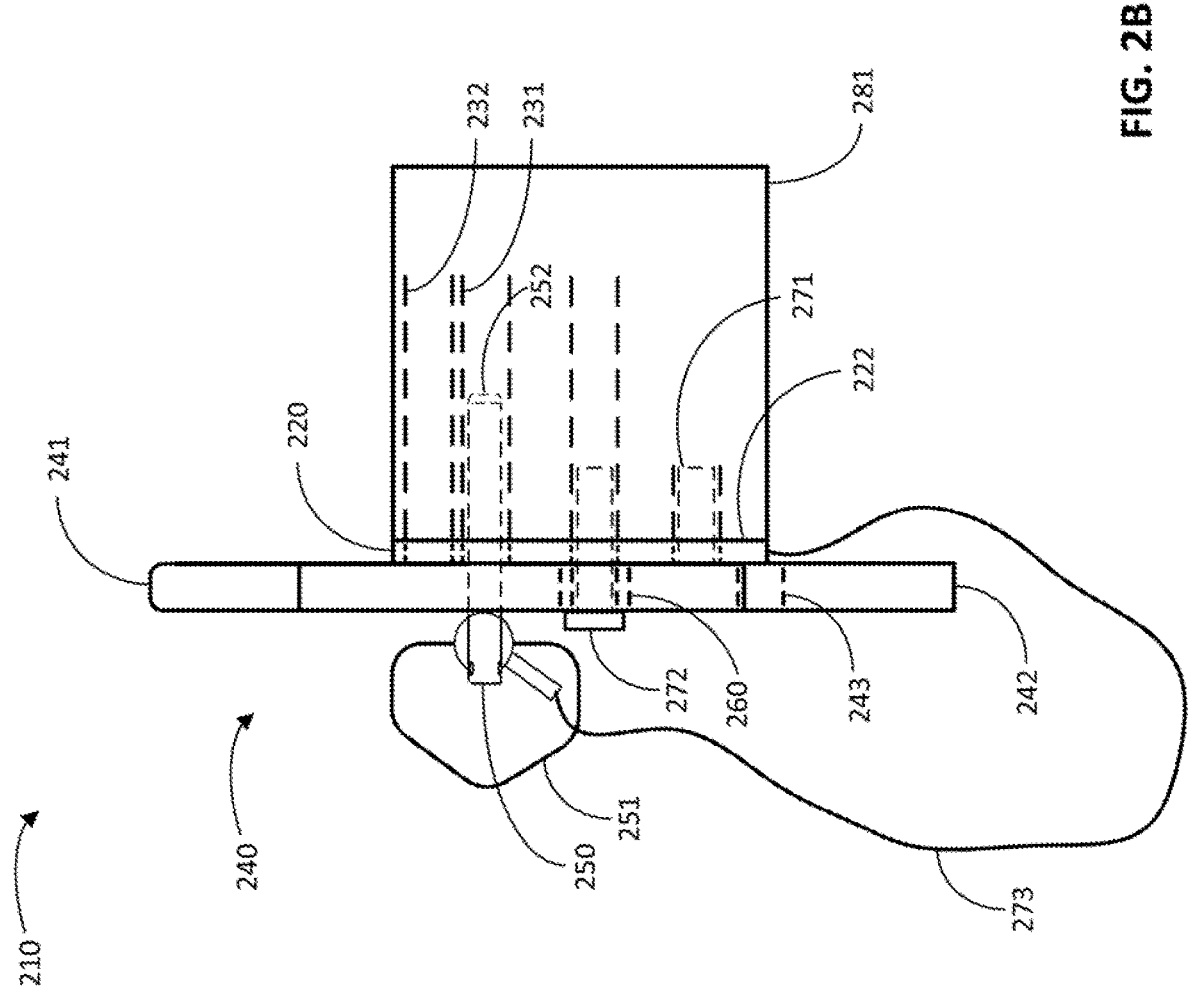
FIG. 2B is a front view of the barrel rolling safety device of FIG. 2A with the pin inserted through the first aperture according to one embodiment herein.

FIG. 2B is a front view of the barrel rolling safety device 210 of FIG. 2A with the pin 250 inserted through the first aperture 231 according to one embodiment herein. The second side 222 of the base plate 220 abuts the first rail 281 of the dunnage rack. The base plate 220 is connected to the first rail 281 of the dunnage rack by the first fastener 271. The first fastener 271 may be inserted through the base plate 220 and into the first rail 281 of the dunnage rack. Further, the stopping arm 240 abuts the first side 221 of the base plate 220. The stopping arm is connected to the base plate 220 and the first rail 281 of the dunnage rack by the second fastener 272. The second fastener 272 may be inserted through the stopping arm 240 and the base plate 220, and into the first rail 281 of the dunnage rack.

In some embodiments, the second fastener 272 may also be inserted through the one or more bushings 260 to allow the stopping arm 240 to rotate smoothly about the second fastener 272. Additionally and/or alternatively, the second fastener 272 may also be inserted through one or more washers between the stopping arm 240 and the first side 221 of the base plate 220 and/or inserted through one or more washers on an outside surface of the stopping arm 240. The bushings 260 and the one or more washers may be made of nylon, and help ensure that the stopping arm 240 continues to rotate smoothly about the second fastener 272 over a long period of time.

In some embodiments, the pin 250 may be inserted through the first aperture 231 and into the first rail 281 of the dunnage rack (as depicted in FIGS. 2A and 2B). In other embodiments, the pin 250 may be inserted through the second aperture 232 and into the first rail 281 of the dunnage rack. In yet other embodiments, the pin 250 may be inserted through the stopping arm aperture 243 and through the second aperture 232, and into the first rail 281 of the dunnage rack. The stopping arm 240 may rotate clockwise, counter-clockwise, or not rotate at all based on the position of the stopping arm 240 and based on which aperture of the first aperture 231, the second aperture 232, and the stopping arm aperture 243 that the pin 250 is inserted through and into the first rail 281 of the dunnage rack. Although not to scale, it is noted that the pin 250 extends outward from the first aperture 231 and beyond the stopping arm 240, such that the stopping arm 240 may be allowed or prevented from rotating clockwise, counter-clockwise, or rotating at all by the pin 250 based on a location of the pin 250.

FIG. 3 is a side view of the barrel rolling safety device 210 with the pin 250 inserted through the first aperture 231 as a barrel traverses a dunnage rack in a first direction according to one embodiment herein. The pin 250 may be inserted into the first aperture 231. As the barrel traverses the dunnage rack in the first direction, a portion of the barrel 291 abuts the first end 241 of the stopping arm 240. The portion of the barrel 291 that abuts the first end 241 of the stopping arm 240 as the barrel traverses the dunnage rack in the first direction causes the stopping arm 240 to rotate counter-clockwise about the second fastener 272 via the bushings 260. Because the pin 250 is inserted in the first aperture 231 and the barrel is traversing the dunnage rack in the first direction, the stopping arm 240 rotates counter-clockwise and allows the barrel to be loaded onto the dunnage rack as the portion of the barrel 291 rolls over the safety device 210 and onto the dunnage rack.

Figure 4:
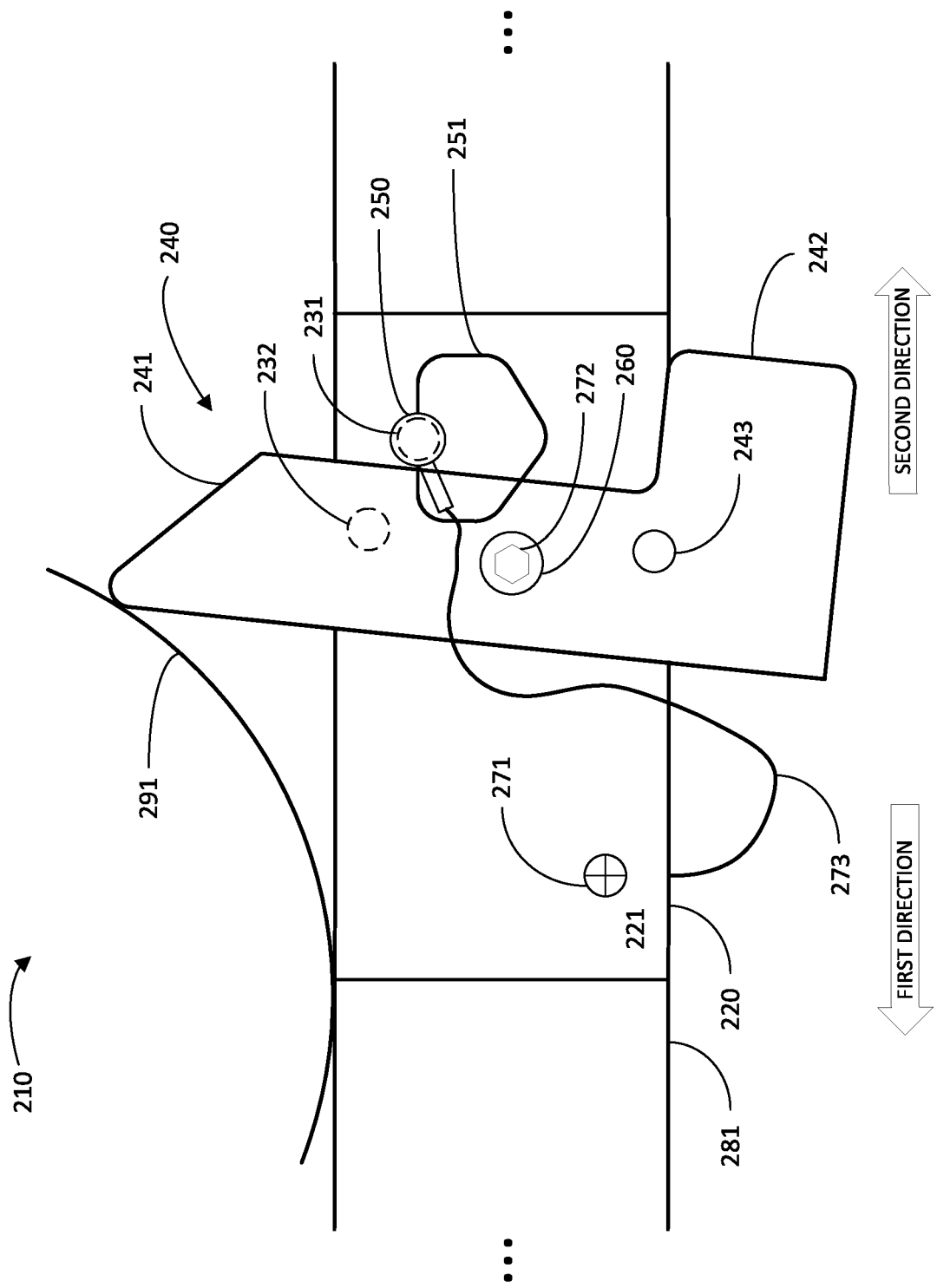
FIG. 4 is a side view of the barrel rolling safety device with the pin inserted through the first aperture as the barrel traverses the dunnage rack in a second direction according to one embodiment herein.

FIG. 4 is a side view of the barrel rolling safety device 210 with the pin 250 inserted through the first aperture 231 as the barrel traverses the dunnage rack in a second direction according to one embodiment herein. As in FIG. 3, the pin 250 may be inserted into the first aperture 231. As the barrel traverses the dunnage rack in the second direction, the portion of the barrel 291 abuts the first end 241 of the stopping arm 240. The portion of the barrel 291 abuts the first end 241 of the stopping arm 240, as opposed to the second end 242 of the stopping arm 240, because the second end 242 of the stopping arm 240 outweighs the first end 241 of the stopping arm 240, and the stopping arm 240 returns to a rest position as described hereinabove. The portion of the barrel 291 that abuts the first end 241 of the stopping arm 240 as the barrel traverses the dunnage rack in the second direction causes the stopping arm 240 to rotate clockwise about the second fastener 272 via the bushings 260. However, because the pin 250 is inserted in the first aperture 231 and the barrel is traversing the dunnage rack in the second direction, the stopping arm 240 abuts the pin 250 and is prevented from rotating any further about the second fastener 272 thereby preventing the barrel from rolling back onto a worker or falling off the dunnage rack. In various embodiments, the pin 250 may remain inserted through the first aperture 231 until the dunnage rack is filled with a desired amount of barrels. In this manner, each of the plurality of barrels loaded onto the dunnage rack may be allowed to traverse the dunnage rack in the first direction over the safety device 210, but prevented from traversing the dunnage rack in the second direction over the safety device 210 thereby creating a safer environment for operators of a barrel storage warehouse.

Figure 5:
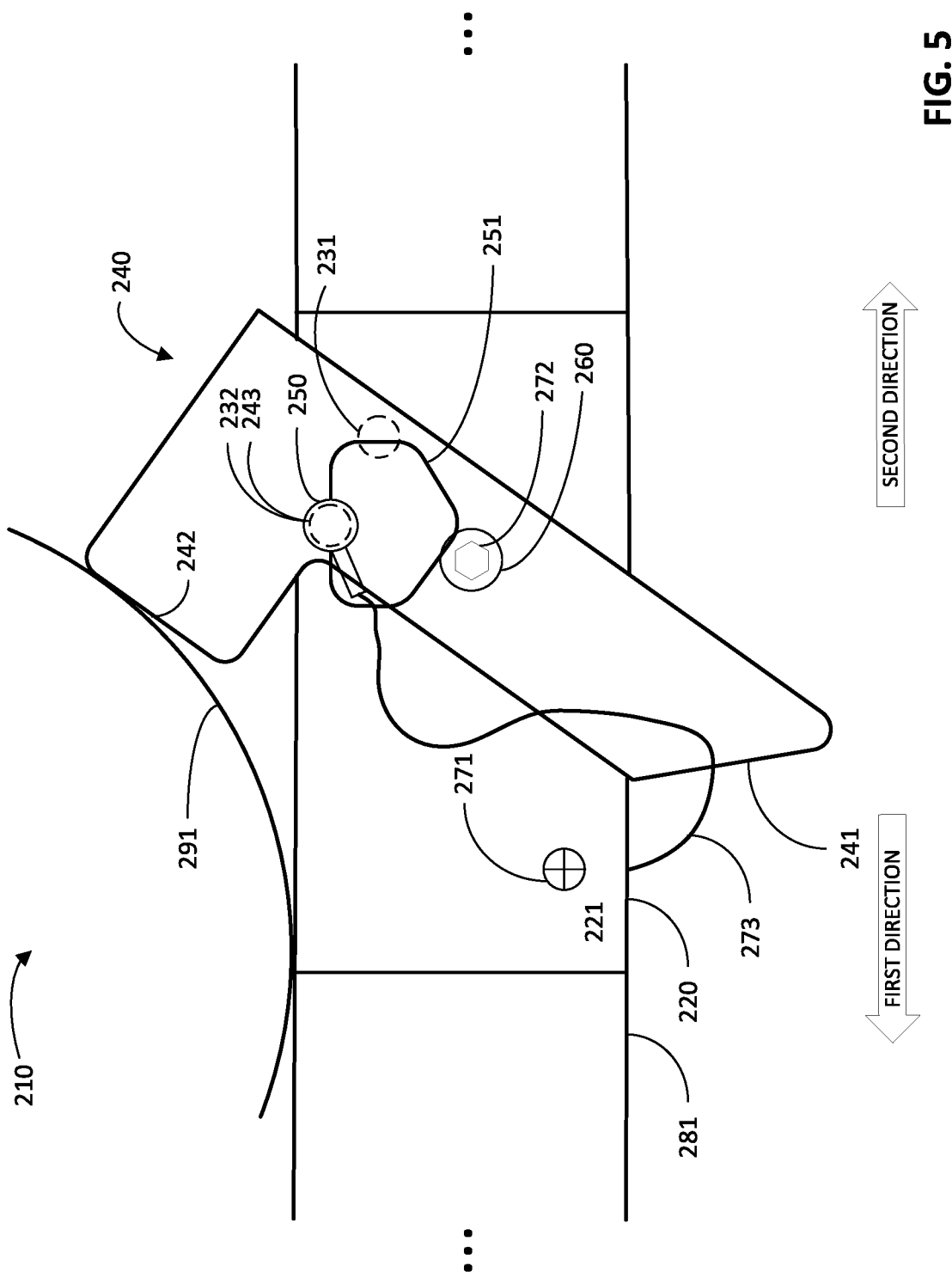
FIG. 5 is a side view of the barrel rolling safety device with the pin inserted through a stopping arm aperture and through a second aperture as the barrel traverses the dunnage rack in the second direction according to one embodiment herein.

FIG. 5 is a side view of the barrel rolling safety device 210 with the pin 250 inserted through the stopping arm aperture 243 and through the second aperture 232 as a barrel traverses a dunnage rack in a second direction according to one embodiment herein. The pin 250 may be removed from the first aperture 231 by pulling on the removal ring 251. The stopping arm 240 may be rotated, such that the second aperture 232 and the stopping arm aperture 243 align. The pin 250 may be inserted through both the second aperture 232 and the stopping arm aperture 243, and into the first rail 281 of the dunnage rack. In various embodiments, if the pin 250 is inserted through both the second aperture 232 and the stopping arm aperture 243, the stopping arm 240 may be prevented from rotating both clockwise and counter-clockwise. In these embodiments, the portion of a barrel 291 may abut the second end 242 of the stopping arm 240, but the stopping arm 240 is prevented from rotating. Accordingly, the barrel cannot traverse along the dunnage rack over the safety device 210 in either the first direction or the second direction.

In various embodiments, the pin 250 may be inserted through the second aperture 232 and the stopping arm aperture 243 when the dunnage rack is full of barrels, and remain inserted through the second aperture 232 and the stopping arm aperture 243 until the resulting spirit contained within each of the barrels in the dunnage rack has reached a desired flavor, maturity, etc. In this manner, each of the barrels stored on the dunnage rack are locked into place on the dunnage rack thereby preventing the barrels stored on the dunnage rack from moving around while other barrels are stored on each of the dunnage racks or during a natural disaster. This creates a safer environment for operators of a barrel storage warehouse.

Figure 6:
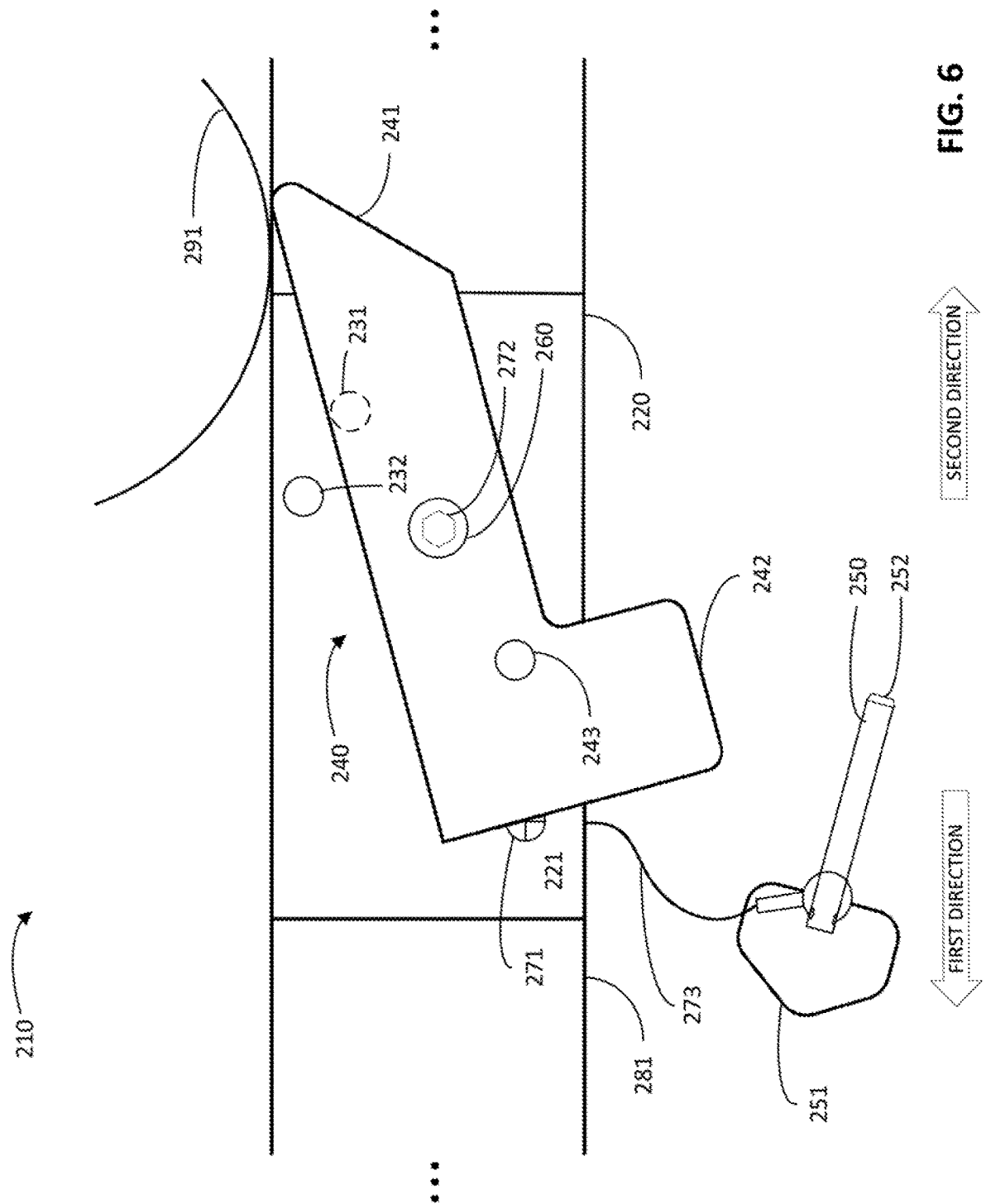
FIG. 6 is a side view of the barrel rolling safety device with the pin removed from the first aperture, the second aperture, and the stopping arm aperture according to one embodiment herein.

FIG. 6 is a side view of the barrel rolling safety device 210 with the pin 250 removed from the first aperture 231, the second aperture 232, and the stopping arm aperture 243 according to one embodiment herein. After the barrels reach a desired flavor, maturity, etc., the barrels may be removed from the dunnage rack. To remove the barrels from the dunnage rack, the pin 250 may be removed by from the second aperture 232 and the stopping arm aperture 243 by pulling on the removal ring 251. The pin 250 may hang freely from the locking plate 273 interposed between the base plate 220 and the first rail 281 by the tether 273. In various embodiments, if the pin 250 is removed from the first aperture 231, the second aperture 232, and the stopping arm aperture 243, then the stopping arm 240 is free to rotate both clockwise and counter-clockwise about the second fastener 272 by the bushings 260.

The pin 250 may further include a spring-loaded ball 252 (e.g., a detent pin). The spring-loaded ball 252 may compress when the pin 250 is initially inserted into any one of the apertures by abutting a surface of a given aperture and may decompress when the pin 250 completely passes through any one of the apertures. By including the spring-loaded ball 252, the pin 250 fits through each of the apertures and into the first rail 281 more securely. In some embodiments, the spring-loaded ball 252 decompresses when it passes completely through a given aperture, but before passing through another given aperture and/or entering the first rail 281. For example, the spring-loaded ball 252 may initially compress as the spring-loaded ball 252 passes through the given aperture and decompress before passing through another given aperture and/or entering the first rail 281. The spring-loaded ball 252 may rest in this decompressed position between the given apertures, the base plate 220, and/or the first rail 281. In this instance, there is some "play" between the apertures and base plate 220 and/or the first rail 281. In some other embodiments, the spring-loaded ball 252 may enter the first rail 281 and rest in this compressed position in the first rail 281 or abutting a given aperture.

In various embodiments, the barrel may be pulled or rolled off the dunnage rack such that the barrel traverses along the dunnage rack in the second direction over the safety device 210. As the barrel traverses the dunnage rack in the second direction, the portion of the barrel 291 abuts the first end 241 of the stopping arm 240 and causes the stopping arm 240 to rotate clockwise. Unlike FIGS. 4 and 5, the pin 250 is removed from each of the first aperture 231, the second aperture 232, and the sopping arm aperture 243 thus allowing the stopping arm 240 to rotate freely and the portion of the barrel 291 to traverse over the safety device 210 in the second direction.

Although the portion of the barrel 291 is illustrated as abutting the first end 241 of the stopping arm 240 which causes the stopping arm 240 to rotate clockwise, the portion of the barrel 291 may alternatively abut the second end 242 of the stopping arm 240 and cause the stopping arm 240 to rotate clockwise. Alternatively, an additional aperture may be provided, such that the additional aperture may prevent both the first end 241 of the stopping arm 240 and the second end 242 of the stopping arm 240 from abutting the portion of the barrel 291, and prevent the stopping arm 240 from rotating about the second fastener 272 by the bushings 260.

As used herein, the term "barrel storage warehouse" refers to a location for storing barrels that contain a resulting spirit for aging and/or curing. For example, these locations are often referred to as rackhouses, rickhouses, and dunnages.

As used herein, the term "dunnage rack" refers to at least two rails, usually made of wood, where a barrel may be stored thereon for aging of a resulting spirit contained within the barrel.

In various embodiments, the first fastener and the second fastener may be at least one of a bolt, a screw, a nail, a pin, a bracket, or the like. In various embodiments, the tether may be at least one of a rope, braided thread, a wire, and the like. In various embodiments, one or more of the first fasteners, the second fastener, and the tether may be coated in polyvinyl chloride (PVC).

In various embodiments, the bushings may be at least one of a washer, nylon bushings, and a nut. In some embodiments, the bushings may be configured such that the second fastener is inserted into the bushings.

In various embodiments, the pin and the removal ring are mode of at least one of steel and trivalent zinc. In various embodiments, the base plate and the stopping arm are made of at least one of steel and aluminum. In various embodiments, the pin may be a detent pin.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

It should also be understood that, unless clearly indicated to the contrary, in any methods claimed herein that include more than one step or act, the order of the steps or acts of the method is not necessarily limited to the order in which the steps or acts of the method are recited.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least of A and B" (or, equivalently, "at least one of A or B," or equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. A safety device, comprising:
a base plate having a first side, a second side, and a plurality of apertures, the second side of the base plate connectable to a first rail of a dunnage rack;
a stopping arm having a first end, a second end, and a stopping arm aperture, the stopping arm connectable to the first side of the base plate, wherein the stopping arm is rotatable; and
a pin, wherein the pin is removable and insertable through each of the plurality of apertures, of the base plate, and through the stopping arm aperture, of the stopping arm, wherein, when the pin is in a first location, the pin allows a barrel to traverse over the stopping arm in a first direction, and prevents the barrel from traversing over the stopping arm in a second direction, and
wherein, when the pin is in a second location, the pin prevents the barrel from traversing over the stopping arm in either the first direction or the second direction.

2. The safety device of claim 1, wherein, when the pin is in the first location, the pin is inserted through a first aperture, of the plurality of apertures of the base plate.

3. The safety device of claim 2, wherein, when the pin is in the first location, the pin causes the first end of the stopping arm to abut a portion of the barrel to prevent the barrel from traversing the dunnage rack in the second direction over the stopping arm.

4. The safety device of claim 1, wherein, when the pin is in the second location, the pin is inserted through the stopping arm aperture, of the stopping arm, and through a second aperture, of the plurality of apertures.

5. The safety device of claim 4, wherein, when the pin is in the second location, the pin causes the second end of the stopping arm to abut a portion of the barrel to prevent the barrel from traversing over the stopping arm in the first direction and the second direction.

6. The safety device of claim 1, wherein when the pin is removed from each of the plurality of apertures, of the base plate, and removed from the stopping arm aperture, of the stopping arm, allows the barrel to traverse over the stopping arm in the first direction and the second direction.

7. The safety device of claim 1, wherein the pin is connectable to the base plate by a tether and includes a removal ring, wherein the pin is removable by the removal ring, and wherein the tether is connectable to the base plate by a locking plate interposed between the base plate and the first rail.

8. The safety device of claim 1, wherein the safety device further includes one or more bushings, and wherein the stopping arm is rotatable by the one or more bushings.

9. The safety device of claim 1, wherein the pin includes a spring-loaded ball that compresses when the pin is initially inserted into at least one of the plurality of apertures, of the base plate, and decompresses when the pin completely passes through the at least one of the plurality of apertures, of the base plate.

10. A safety device, comprising:
a plurality of base plates, each base plate, of the plurality of base plates, having a first side, a second side, and a plurality of apertures, the second side of a first base plate, of the plurality of base plates, connectable to a first rail of a dunnage rack, and the second side of a second base plate, of the plurality of base plates, connectable to a second rail of the dunnage rack;
a plurality of stopping arms, each stopping arm, of the plurality of stopping arms, having a first end, a second end, and a stopping arm aperture, a first stopping arm of the stopping arms connectable to the first side of the first base plate, a second stopping arm of the stopping arms connectable to the first side of the second base plate, wherein each of the plurality of stopping arms are rotatable; and
a plurality of corresponding pins, wherein a first pin, of the plurality of corresponding pins, is removable and insertable through each of the plurality of apertures, of the first base plate, and is removable and insertable through the stopping arm aperture of the first stopping arm, and wherein a second pin, of the plurality of corresponding pins, is removable and insertable through each of the plurality of apertures, of the second base plate, and is removable and insertable through the stopping arm aperture of the second stopping arm, wherein, when the first pin is in a first location and when the second pin is in an additional first location, the first pin and the second pin allow the barrel to traverse over the first stopping arm and the second stopping arm in a first direction, and prevent the barrel from traversing over the first stopping arm and the second stopping arm in a second direction, and wherein, when the first pin is in a second location and when the second pin is in an additional second location, the first pin and the second pin prevent the barrel from traversing over the first stopping arm and the second stopping arm in either the first direction or the second direction.

11. A method, comprising:

connecting a safety device to a first rail of a dunnage rack, the safety device comprising:
- a base plate having a first side, a second side, and a plurality of apertures, the plurality of apertures including at least a first aperture and a second aperture,
- a stopping arm having a first end, a second end, and a stopping arm aperture, wherein the stopping arm is rotatable, and
- a pin, wherein the pin is removable and insertable through each of the plurality of apertures, of the base plate, and through the stopping arm aperture, of the stopping arm;

inserting the pin through the first aperture, of the plurality of apertures of the base plate;

lifting a barrel to the dunnage rack;

pushing the barrel onto the dunnage rack in a first direction over the safety device;

removing the pin from the first aperture of the plurality of apertures of the base plate;

rotating the stopping arm causing the stopping arm aperture, of the stopping arm, and the second aperture, of the plurality of apertures of the base plate, to align; and inserting the pin through the stopping arm aperture, of the stopping arm, and through the second aperture, of the plurality of apertures of the base plate.

12. The method of claim 11, wherein inserting the pin through the first aperture, of the plurality of apertures of the base plate, allows the barrel to traverse over the stopping arm in the first direction.

13. The method of claim 11, wherein inserting the pin through the first aperture, of the plurality of apertures of the base plate, prevents the barrel from traversing over the stopping arm in a second direction.

14. The method of claim 11, wherein inserting the pin through the stopping arm aperture, of the stopping arm, and through the second aperture, of the plurality of apertures of the base plate, prevents the barrel from traversing over the stopping arm in both the first direction and a second direction.

15. The method of claim 11 further comprising:

removing the pin from the stopping arm aperture, of the stopping arm, and the second aperture, of the plurality of apertures of the base plate; and pulling the barrel off the dunnage rack in a second direction over the safety device.

16. The method of claim 15, wherein removing the pin from the stopping arm aperture, of the stopping arm, and from the second aperture, of the plurality of apertures of the base plate, allows the barrel to traverse over the stopping arm in both the first direction and a second direction.

17. The method of claim 11, wherein the pin is connectable to the base plate by a tether and includes a removal ring, wherein the pin is removable by the removal ring and wherein the tether is connectable to the base plate by a locking plate interposed between the base plate and the first rail.

18. The method of claim 11, wherein the safety device further includes one or more bushings, and wherein the stopping arm is rotatable by the one or more bushings.

* * * * *